United States Patent [19]
Wagner

[11] 3,942,405
[45] Mar. 9, 1976

[54] PIERCING SHARP POINTED GYPSUM BOARD SCREW FOR METAL STUDS

[76] Inventor: John Bradley Wagner, 1176 Boulevard Way, Walnut Creek, Calif. 94595

[22] Filed: Sept. 23, 1974

[21] Appl. No.: 508,178

[52] U.S. Cl. ................................................. 85/46
[51] Int. Cl.² ........................................ F16B 25/00
[58] Field of Search .................... 85/41, 46, 48, 44

[56] References Cited
UNITED STATES PATENTS

| | | | |
|---|---|---|---|
| 410,698 | 9/1889 | Rogers | 85/48 |
| 449,887 | 4/1891 | Rogers | 85/46 |
| 1,749,903 | 3/1930 | Cannon | 85/41 |
| 2,314,391 | 3/1943 | De Vellier | 85/48 |
| 3,541,918 | 11/1970 | Johnson | 85/46 |
| 3,861,269 | 1/1975 | Laverty | 85/46 |
| R3,941 | 4/1870 | Pierce | 85/46 |
| R28,111 | 8/1974 | Laverty | 85/46 |

FOREIGN PATENTS OR APPLICATIONS 598,490   10/1959   Italy ......................................... 85/46

*Primary Examiner*—Marion Parsons, Jr.

[57] ABSTRACT

A screw having a shank and a tapered portion with an especially sharp point for attaching gypsum board to metal building studs having multiple threads occuring within the other in the body portion. In the tapered portion of the screw one of the threads gradually decreases in diameter and fades into the tapered portion of the shank and terminates. The other thread continues on toward the point end, decreases in diameter and fades into the tapered portion of the shank at a point nearer the pointed end of the screw.

6 Claims, 6 Drawing Figures

3,942,405

PIERCING SHARP POINTED GYPSUM BOARD SCREW FOR METAL STUDS

BACKGROUND OF THE INVENTION

Gypsum board sheets are fastened to sheet metal building studs by self drilling and tapping screws. Commercially, the screws are inserted by electrically powered screw guns which rotate at about 2500 rpm. The screw point moves rapidly through the soft gypsum board and the outer layers of paper on both faces of the sheet, but when the point of the screw reaches the outer surface of the metal stud, it is essential that the screw penetrate the metal stud in the shortest possible time and without hesitation. If the screw hesitates, i.e., the screw gun continues to rotate the screw rapidly without forward motion of the screw or with a greatly diminished velocity, the screw threads will strip the threads made in the gypsum board and in effect, the screw will become a drill auger and bring to the surface of the gypsum board, the soft gypsum. Further, the screw threads will rip and tear the paper surface of the gypsum board and the ragged edges of the paper will protrude from beneath the edges of the head of the screw. The paper edges, known as "frizzies" in the trade, must be hand picked from the gypsum board wall so that the thin coat of plaster can properly cover the screw heads to leave a smooth unblemished wall surface.

Numerous approaches to the "point" problem have been taken. Some screw manufacturers have patented special chisel points such as Knohl, U.S. Pat. No. 3,207,023.

Some manufacturer's have attempted to form a sharp point by using an eight threads per inch design so that there will be sufficient material at the point end of the screw to form the necessary sharp unthreaded cone portion at the tip.

The problem with the eight thread per inch screw for fastening to sheet metal, however, is the fact that thread pitch or spacing between the threads exceeds the thickness of the metal and the thread lacks holding power with the metal.

SUMMARY OF THE INVENTION

The gist of the present invention is a screw which has a tapered point portion with a substantial portion having only eight threads per inch and a body portion with sixteen threads per inch. All threads on the body portion have the same minor diameter, the same major diameter, and the same pitch. Further, the screw is formed with one thread formed intermediate the other thread.

The very tip of the tapered portion forms a very sharp conical point which quickly penetrates about 20 gauge or lighter metal. The first thread which begins on the tapered conical point, gradually increases in diameter and thread height from a termination point where the thread may have the same diameter as the conical tapered portion of the screw. With the gradually increasing diameter of a single thread and thread height for a single thread, it is much easier for the screw to cut into the sidewall of the opening made by the conical point and begin to thread into the metal.

After the first thread has begun to form a thread groove in the metal, a second thread, gradually increasing in diameter from its termination point in the tapered point, in which the thread has the same diameter as the conical portion of the screw forms a second thread groove in the gypsum board and the metal Since both threads within the shank portion are of equal pitch, as for example 8 threads per inch, travel is very rapid. Finally, since the second thread is intermediate, or within the first thread, the net result is for example a 16 thread per inch format which gives good holding power in thin metal.

BRIEF DESCRIPTION OF THE PREFERRED EMBODIMENTS OF THE PRESENT INVENTION

Figure 1:
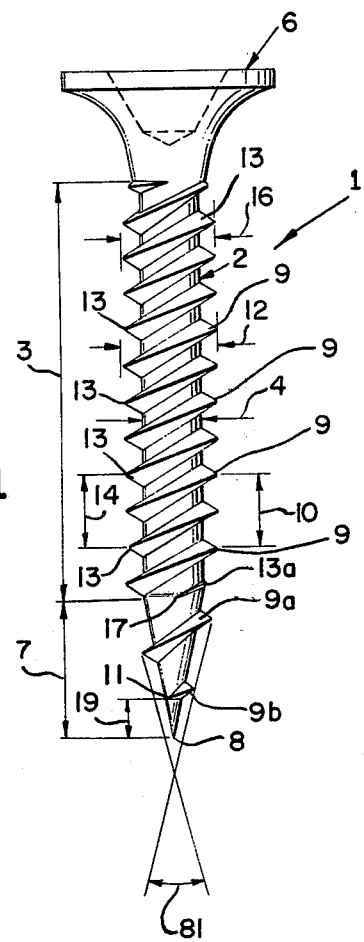
FIG. 1 is a side view of the screw constructed in accordance with the present invention.
Figure 2:
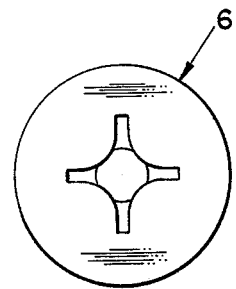
FIG. 2 is a plan view of the head of the screw shown in FIG. 1.
Figure 3:
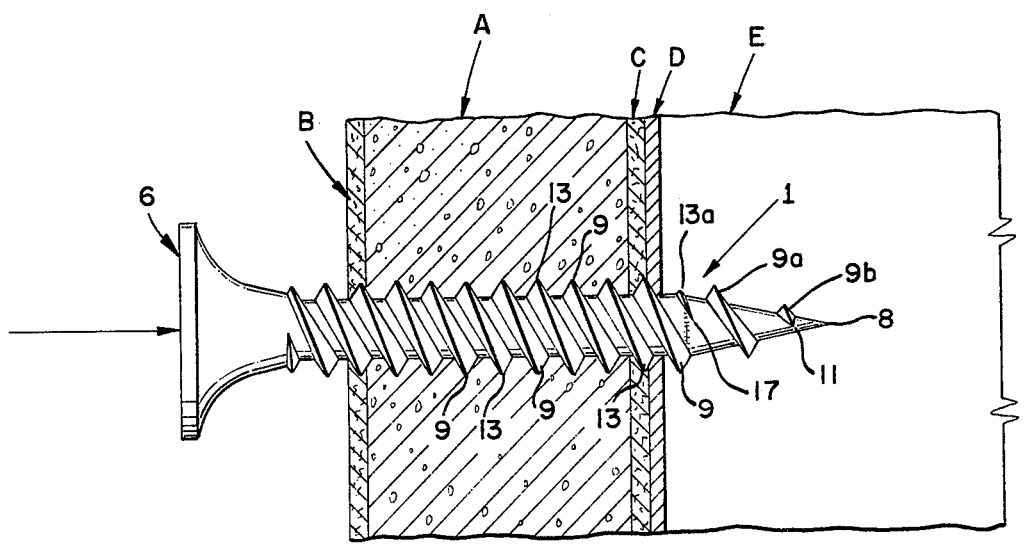
FIG. 3 is a side view of the screw as shown in FIGS. 1 and 2 entering a gypsum board and metal stud.

The screw 1 of the present invention shown in FIGS. 1, 2, and 3 is a sharp pointed, self-drilling and tapping fastener which is primarily useful for attaching gypsum board A having an outer paper layer B and an inner layer C to a face D of a sheet metal stud E.

The screw consists briefly of a shank 2 having a body portion 3 which has a uniform minor diameter 4 with a head 6 at the head end and a tapered section 7 terminating in a sharp point 8 at the point end. The first thread 9 is formed in the body portion and continues into the tapered section as shown by threads 9a and 9b and has a uniform pitch 10 extending from the head end through the body portion and terminates adjacent the point 8 at a terminal point 11. The first thread has a uniform major diameter 12 in the body portion and gradually decreases in diameter and thread height in the tapered portion and terminates at or near the point of the screw as shown by threads 9a and 9b.

A second thread 13 is located intermediate the first threads and has a uniform pitch 14 substantially equal to the pitch of the first thread extending from the head end, through the body portion and terminating in the tapered section short of the termination point of the first thread. The second thread has a uniform major diameter 16 substantially equal to the major diameter of the first thread and gradually decreases in diameter and thread height adjacent the tapered end as shown by thread portion 13a until the thread fades at terminal point 17 into the tapered portion.

The second thread terminates at approximately the distance of one half or 1.5 times the thread pitch short of the termination point of the first thread. As shown in FIGS. 1 and 3, the second thread termination point 17 is 1.5 times the pitch distance from the termination point 11 of the first thread. The purpose of starting the second thread soon after entry of the first thread is to insure that the screw will enter the thin metal stud and continue advancing into the stud without hesitation.

The tapered portion of the screw ends with a point 8 and is substantially conical in shape. As shown in the drawings, the conical end portion 19 is free of any threads and forms a sharp point for penetrating the metal. As an example, the distance 19 may vary from 0 to 0.030 in.. Where manufacturing processes permit, the thread helix angle should vary at the end to be more nearly parallel to the axis of the screw so that the thread is able to initially help cut into the metal. The helix angle varies between 25° and 45° from a plane perpendicular to the axis of the screw.

As shown in FIGS. 1 and 3, the second thread terminates at point 17 which is at the junction of the body portion and the tapered portion. This is a logical point from the viewpoint of manufacture as there is metal available at this point for making a second thread. Preferably the second thread should be started near the point end so as to grip the sheet metal and continue the forward direction of the screw without hesitation. In some instances, however, it may be permissible to terminate the second thread in the body portion of the screw above and adjacent to the junction of the tapered portion and the body portion. This placement of the thread is slightly less desirable as the screw is at its greatest minor diameter in the body portion and the second screw thread is not as easily started.

The screw threads of the present invention have a substantially triangular cross section throughout their entire length. The more nearly perfectly triangular and pointed the threads can be formed greatly enhances their ability to cut into the metal and turn freely once the grooves are formed in the metal. Screw threads which have double points at the apex of the triangular thread and which vary in thickness at their apexes will cause uneven grooving in the metal and will not have the holding power of a thread of uniform triangular cross section.

BRIEF DESCRIPTION OF AN ALTERNATE FORM OF THE INVENTION

Figure 4:
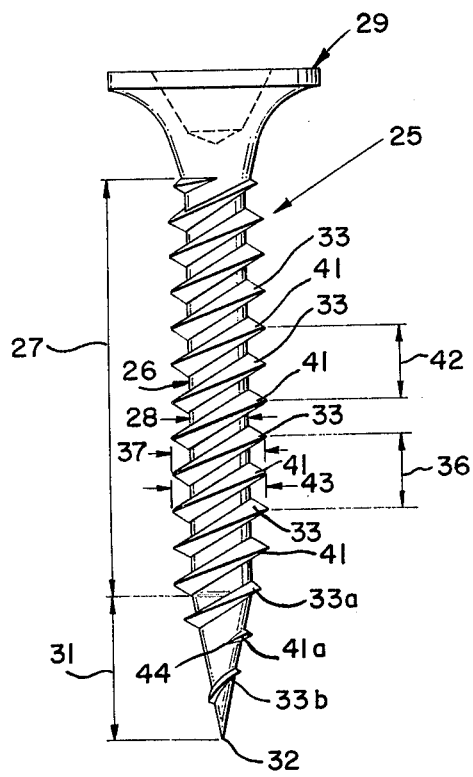
FIG. 4 is a side view of another form of the screw.
Figure 5:
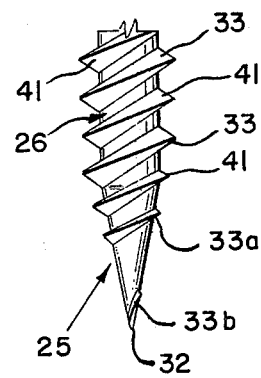
FIG. 5 is a side view of the screw shown in FIG. 4 but rotated 180°.

The screw 25 of the alternate form of the invention is shown in FIGS. 4 and 5.

The screw 25 consists briefly of a shank 26 having a body portion 27 which has a uniform minor diameter 28 with a head 29 at the head end and a tapered section 31 terminating in a sharp point 32 at the point end. The first thread 33 is formed in the body portion and continues into the tapered section as shown by threads 33a and 33b and has a uniform pitch 36 extending from the head end through the body portion and terminates at the point 32. The first thread 33 has a uniform major diameter 37 in the body portion and gradually decreases in diameter in the tapered portion as shown by threads 33a and 33b.

A second thread 41 is located intermediate the first threads and has a uniform pitch 42 substantially equal to the pitch of the first thread extending from the head end, through the body portion and terminating in the tapered section short of the termination point of the first thread. The second thread has a uniform major diameter 43 substantially equal to the major diameter of the first thread and gradually decreases in diameter adjacent the tapered end until the thread 41a fades at terminal point 44 into the tapered portion.

The second thread terminates at approximately the distance of 1.5 times the thread pitch short of the termination point of the first thread. The purpose of starting the second thread soon after entry of the first thread is to insure that the screw will enter the thin metal stud and continue advancing into the stud without hesitation. As shown in FIG. 5, the thread helix angle should vary at the end so that it is nearly parallel to the axis of the screw so that the thread is able to help cut into the metal. The helix angle varies between 25 and 45 degrees from a plane perpendicular to the axis of the screw.

As shown in FIGS. 4 and 5, the second thread indicated as 41a terminates at point 44 in the tapered portion between the first turn 33b and second turn 33a of the first thread. The second thread terminates near the point end so as to grip the sheet metal and continue the forward direction of the screw without hesitation.

The screw threads of the present invention have a substantially triangular cross section throughout their entire length. The more nearly perfectly triangular and pointed the threads can be formed greatly enhances their ability to cut into the metal and turn freely once the grooves are formed in the metal.

BRIEF DESCRIPTION OF ANOTHER ALTERNATE FORM OF THE INVENTION

Figure 6:
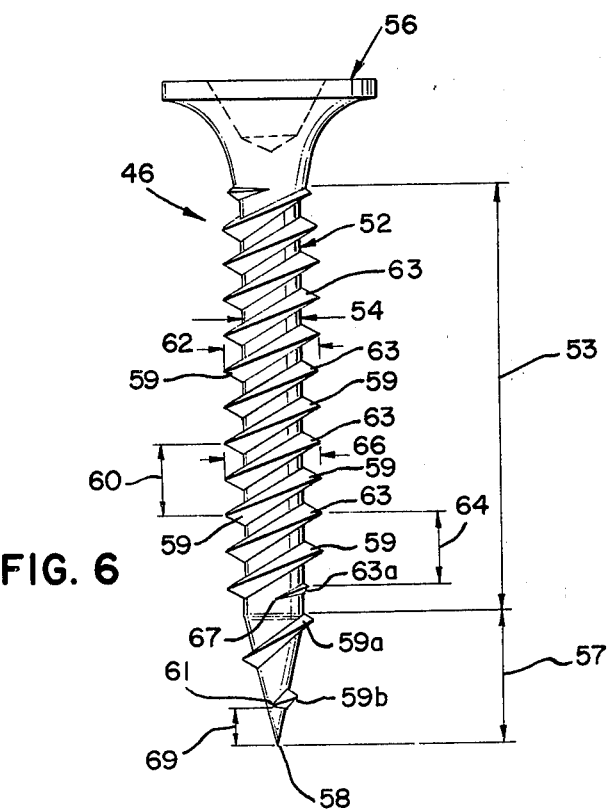
FIG. 6 is a side view of still another form of the invention.

The screw 46 of the second alternate form of the invention shown in FIG. 6 consists briefly of a shank 52 having a body portion 53 which has a uniform minor diameter 54 with a head 56 at the head end and a tapered sections 57 terminating in a sharp point 58 at the point end. The first thread 59 is formed in the body portion and continues into the tapered section as shown by threads 59 and 59b and has a uniform pitch 60 extending from the head end through the body portion and terminates adjacent the point 58 at a terminal point 61. The first thread has a uniform major diameter 62 in the body portion and gradually decreases in diameter in the tapered portion as shown by threads 59a and 59b.

A second thread 63 is located intermediate the first threads and has a uniform pitch 64 substantially equal to the pitch of the first thread extending from the head end into the body portion and terminates in the body portion short of the conical tapered section. The termination point should be within a distance of one thread pitch of the intersection of the intersection of the body portion and the tapered portion so that the second thread will start easily in the metal.

The tapered portion of the screw ends with a point 58 and is substantially conical in shape. As shown in the drawings, the conical end portion 69 is free or practically of any threads and forms a sharp point for penetrating the metal.

EXAMPLE SPECIFICATIONS

As an example of a screw manufactured in accordance with the present invention, the screw may be rolled from a number 6 wire which is 1 in. to approximately 1 5/8 in. long. The material may be SAE 1018 steel, case hardened and have a phosphate finish. The head should have a diameter of approximately 0.355 in. to 0.330 in. with a major diameter of approximately 0.154 in. to 0.147 in. and a minor diameter of approximately 0.102 in. to 0.096 in.. The helix angle of both threads is approximately 18°.

The tapered point section preferably has an angle 81 of approximately 30°and the length of the tapered portion should be approximately 0.24 in.. Both threads should be approximately 8 threads per inch. The triangular shape of the threads, (the included angle) should be 60° or less.

The screws are held to the end of a screw gun as by a magnet or other mechanical device. The operator inserts the screw by turning on the screw gun which rotates at 4000 to 4500 rpms, and presses the screw into the gypsum board. When the screw has drilled into the metal and pulled itself into the stud and the gypsum board until the head is sunk just slightly below the face of the gypsum board, the screw gun automatically stops.

I claim:

1. A piercing sharp pointed, self drilling and tapping gypsum board screw conprising:
   a. a shank having a body portion having a uniform minor diameter with a head at the head end and a tapered conical section terminating in a sharp point at the point end;
   b. a first thread formed in said body portion and said tapered section and having a uniform pitch extending from said head end through said body portion and terminating adjacent said pointed end;
   c. said first thread having a uniform major diameter in said body portion and gradually decreasing in diameter and thread height in said tapered portion until said thread fades substantially completely;
   d. a second thread located intermediate said first threads spaced from said first thread and having a uniform pitch substantially equal to the pitch of said first thread extending from said head end, through said body portion and terminating in said tapered section immediately adjacent the junction of said body portion and said tapered section short of the termination point of said first thread;
   e. said second thread having a uniform major diameter substantially equal to the major diameter of said first thread and gradually decreasing in diameter and thread height adjacent said tapered end until said thread fades substantially completely at its termination point;
   f. said tapered conical section is formed so as to have an included angle of less than approximately 30° and a length of at least approximately 1.5 times the thread pitch; and
   g. the portions of said first and second threads located in the tapered portion of said screw gradually diminish in the height of the threads from the tapered surface to the top edge of the thread as a function of the distance from said screw point until the thread merges with the tapered portion with a substantially minimal thread height.

2. A screw as described in claim 1 comprising:
   a. said second thread terminates at approximately the distance of one half of one thread pitch short of the termination point of said first thread.

3. A screw as described in claim 1 comprising:
   a. said second thread terminates at approximately the distance of one and a half times said thread pitch short of the termination point of said first thread.

4. A screw as described in claim 1 comprising:
   a. said tapered portion of said screw ends with a point portion substantially conical in shape; and
   b. said tapered portion carries less than about 1.5 turns of said first thread.

5. A screw as described in claim 1 comprising:
   a. said tapered portion of said screw ends with a point portion substantially conical in shape and free of threads.

6. A screw as described in claim 1 comprising:
   a. said first and second threads have a substantially triangular cross section throughout their entire length.

* * * * *

UNITED STATES PATENT AND TRADEMARK OFFICE
CERTIFICATE OF CORRECTION

PATENT NO. : 3,942,405
DATED : March 9, 1976
INVENTOR(S) : John Bradley Wagner

It is certified that error appears in the above-identified patent and that said Letters Patent are hereby corrected as shown below:

Column 1, line 68, change "point" to ---portion---

Signed and Sealed this

Twentieth Day of July 1976

[SEAL]

Attest:

RUTH C. MASON
*Attesting Officer*

C. MARSHALL DANN
*Commissioner of Patents and Trademarks*